United States Patent
Wang et al.

(10) Patent No.: US 9,104,932 B2
(45) Date of Patent: Aug. 11, 2015

(54) SYSTEMS AND METHODS FOR PATTERN STITCHING AND DECODING USING MULTIPLE CAPTURED IMAGES

(71) Applicants: Xianju Wang, Bedford, MA (US); Xiangyun Ye, Framingham, MA (US)

(72) Inventors: Xianju Wang, Bedford, MA (US); Xiangyun Ye, Framingham, MA (US)

(73) Assignee: Cognex Corporation, Natick, MA (US)

( * ) Notice: Subject to any disclaimer, the term of this patent is extended or adjusted under 35 U.S.C. 154(b) by 139 days.

(21) Appl. No.: 13/843,057

(22) Filed: Mar. 15, 2013

(65) Prior Publication Data

US 2014/0270539 A1 Sep. 18, 2014

(51) Int. Cl.
*G06K 9/48* (2006.01)
*G06K 7/14* (2006.01)

(52) U.S. Cl.
CPC ............ *G06K 7/1417* (2013.01); *G06K 7/1491* (2013.01)

(58) Field of Classification Search
None
See application file for complete search history.

(56) References Cited

U.S. PATENT DOCUMENTS

| | | | |
|---|---|---|---|
| 5,262,626 A | 11/1993 | Goren et al. | |
| 6,446,868 B1 | 9/2002 | Robertson et al. | |
| 2001/0042789 A1 | 11/2001 | Krichever et al. | |
| 2003/0062418 A1 | 4/2003 | Barber et al. | |
| 2003/0201328 A1 | 10/2003 | Jam et al. | |
| 2005/0275831 A1 | 12/2005 | Silver | |
| 2006/0022052 A1 | 2/2006 | Patel et al. | |
| 2006/0131419 A1 | 6/2006 | Nunnink | |
| 2006/0133757 A1 | 6/2006 | Nunnink | |
| 2006/0249581 A1 | 11/2006 | Smith | |
| 2006/0283952 A1 | 12/2006 | Wang | |
| 2007/0181692 A1 | 8/2007 | Barkan et al. | |
| 2011/0073655 A1* | 3/2011 | Simske et al. | 235/462.32 |
| 2013/0134222 A1 | 5/2013 | Gassler et al. | |

FOREIGN PATENT DOCUMENTS

| | | |
|---|---|---|
| DE | 202012102113 U1 | 3/2012 |
| EP | 0896290 B1 | 10/2004 |
| EP | 1469420 A2 | 10/2004 |
| EP | 1975849 A1 | 10/2008 |
| JP | 2005012619 A | 1/2005 |
| JP | 2005276119 A | 10/2005 |
| JP | 2010066822 A | 3/2010 |
| WO | 03102859 A1 | 12/2003 |
| WO | 2008118419 A1 | 10/2008 |
| WO | 2008118425 A1 | 10/2008 |
| WO | 2009064759 A1 | 5/2009 |

OTHER PUBLICATIONS

European Patent Office, European Search Report in Application No. 14152881.0-1806; dated Aug. 8, 2014.
PCT International Search Report and Written Opinion, PCT/US2008/083191, Feb. 17, 2009.

(Continued)

*Primary Examiner* — Siamak Harandi
(74) *Attorney, Agent, or Firm* — Quarles & Brady LLP

(57) ABSTRACT

Systems and methods read machine readable symbols, the systems and methods capture multiple images of the symbol and can locate symbol data region(s) from an image even when the symbol data is corrupted and not decodable. Binary matrices are generated of the symbol data regions obtained from the multiple images and can be accumulated to generate a decodable image. A correspondence can be established among multiple images acquired on the same symbol when the symbol has moved from one image to the next.

17 Claims, 11 Drawing Sheets

(56) References Cited

OTHER PUBLICATIONS

United States Patent and Trademark Office, Office Action Summary and Detailed Action, U.S. Appl. No. 12/267,342, Dec. 21, 2009.

United States Patent and Trademark Office, Office Action Summary and Detailed Action, U.S. Appl. No. 12/267,342, Aug. 3, 2010.

United States Patent and Trademark Office, Office Action Summary and Detailed Action, U.S. Appl. No. 12/267,342, Jan. 5, 2011.

* cited by examiner

SYSTEMS AND METHODS FOR PATTERN STITCHING AND DECODING USING MULTIPLE CAPTURED IMAGES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE TECHNOLOGY

The present technology relates to imaging systems and methods for decoding images, and more specifically, to imaging systems and methods for stitching and decoding images using data combined from multiple captured images.

Imaging systems use image acquisition devices that include camera sensors to deliver information on a viewed subject. The system then interprets this information according to a variety of algorithms to perform a programmed decision-making and/or identification function. For an image to be most-effectively acquired by a sensor in the visible, and near-visible light range, the subject is typically illuminated.

Symbology reading (also commonly termed "barcode" scanning) using an image sensor, entails the aiming of an image acquisition sensor (CMOS camera, CCD, etc.) at a location on an object that contains a symbol (a "barcode" for example), and acquiring an image of that symbol. The symbol contains a set of predetermined patterns that represent an ordered group of characters or shapes from which an attached data processor (for example a microcomputer) can derive useful information about the object (e.g. its serial number, type, model, price, etc.). Symbols/barcodes are available in a variety of shapes and sizes. Two of the most commonly employed symbol types used in marking and identifying objects are the so-called one-dimensional barcode, consisting of a line of vertical stripes of varying width and spacing, and the so-called two-dimensional barcode consisting of a two-dimensional array of dots or rectangles.

In many imaging applications, surface features, illumination, movement, vibration or a multitude of other variations can result in an image that, on its own, can be partially unreadable. For example, an imaging system can derive a plurality of images of a symbol on an object as the object is moving down a conveyor line. In this arrangement, relative movement between the imaging device and the object occurs. A machine vision application embedded in the processing circuitry of the imaging system derives a plurality of images of the symbol on the object. For any of the reasons above, one or more of the derived image can be partially unreadable.

While the exemplary machine vision detector may acquire multiple images of the object/feature of interest as it passes through the field of view, each image is used individually to perform a detection and/or triggering function.

BRIEF SUMMARY OF THE TECHNOLOGY

The present embodiments overcomes the disadvantages of the prior art by providing systems and methods for reading machine readable symbols, the systems and methods capture multiple images of the symbol and can locate symbol data region(s) from an image even when the symbol data is corrupted and not decodable. Binary matrices are generated of the symbol data regions obtained from the multiple images and can be accumulated to generate a decodable image. A correspondence can be established among multiple images acquired on the same symbol when the symbol has moved from one image to the next.

Accordingly, some embodiments comprise systems for decoding a symbol using images of the symbol. The system comprises an imaging device, the imaging device to acquire a first image and a second image, the first image including a first symbol data region, and the second image including a second symbol data region. A processor is operatively coupled to the imaging device, the processor to execute a data stitching algorithm, wherein the data stitching algorithm converts the first symbol data region into a first binary matrix and the second symbol data region into a second binary matrix, the data stitching algorithm accumulating the first binary matrix with the second binary matrix to generate an accumulative binary matrix, the accumulative binary matrix being a decodable representation of the symbol.

Other embodiments comprise a system for establishing a correspondence between a first image and a subsequent image of a machine readable symbol. The system comprises an imaging device, the imaging device to acquire the first image and the subsequent image, the first image including a first symbol data region, and the subsequent image including a subsequent symbol data region, the first symbol data region having a first position and a first scale, and the subsequent symbol data region having a second position and a second scale, the second position and the second scale being different than the first position and the first scale. A processor is operatively coupled to the imaging device, the processor to execute a data stitching algorithm, wherein the data stitching algorithm generates a synthetic model of the machine readable symbol, and performs a correlation on a synthetic model position to the second position and the second scale of the subsequent symbol data region. Based on the correlation, the second position and the second scale of the subsequent symbol data region is adjusted to produce a refined subsequent image, such that the first image and the subsequent image can be stitched together for decoding.

Consistent with the above, some embodiments include a method for decoding a symbol using images of the symbol. The method includes acquiring a first image and a second image using an imaging device, the first image including a first symbol data region, and the second image including a second symbol data region; converting the first symbol data region into a first binary matrix and the second symbol data region into a second binary matrix; accumulating the first binary matrix with the second binary matrix; and generating an accumulative binary matrix, the accumulative binary matrix being a decodable representation of the symbol.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

Figure 1:
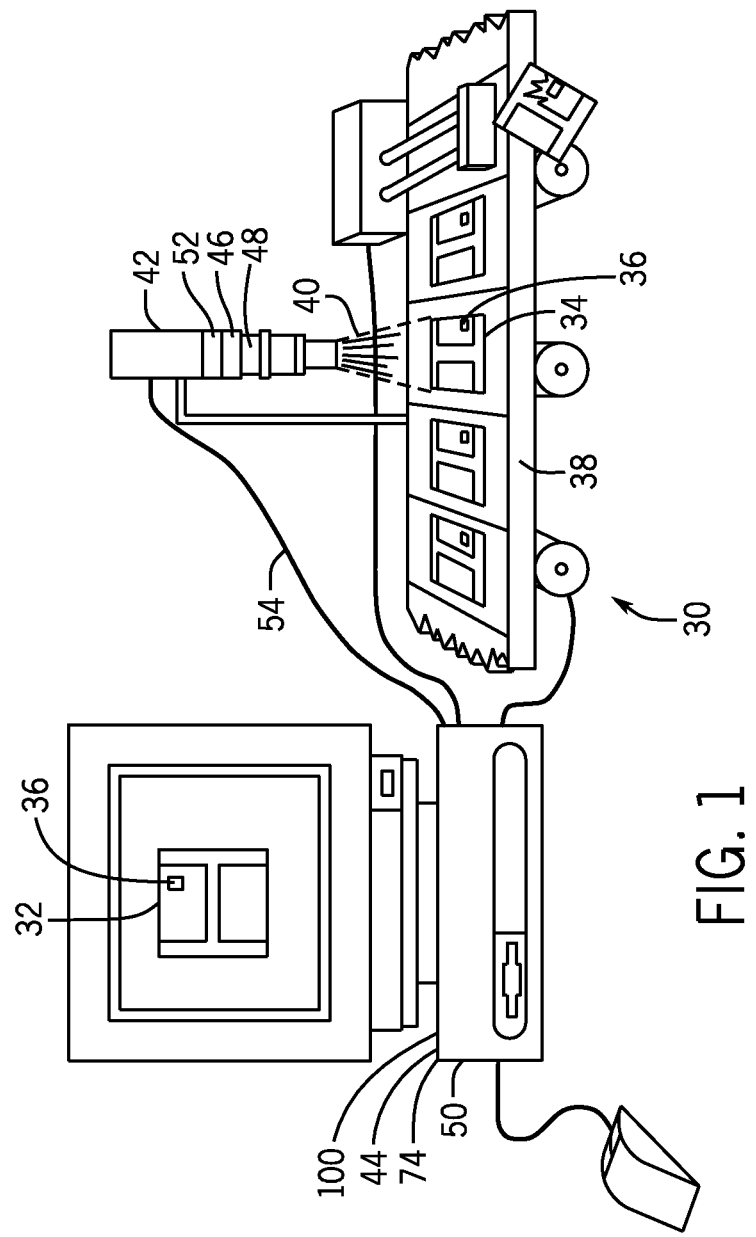
FIG. 1 is a schematic view of a typical vision system configuration including a fixed scanner for acquiring a plurality of images of an object, in accordance with the present embodiments.
Figure 2:
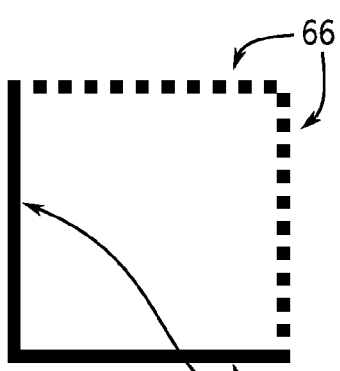
FIGS. 2-7 are views of various 2D matrix symbol features and styles.
Figure 3:
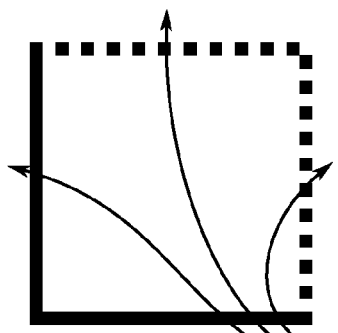
Figure 4:
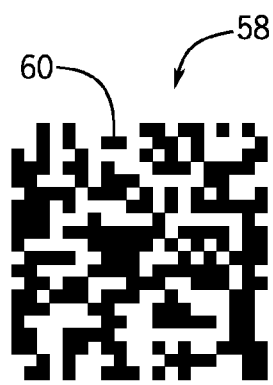

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory" may also include other types of memory or combinations thereof.

Embodiments of the technology are described below by using diagrams to illustrate either the structure or processing of embodiments used to implement the embodiments of the present technology. Using the diagrams in this manner to present embodiments of the technology should not be construed as limiting of its scope. The present technology contemplates both an electronic device configuration and systems and methods for stitching and decoding images using data combined from multiple captured images.

The various embodiments of a machine vision system will be described in connection with a fixed mount scanner adapted to scan a 2D matrix symbol and capable of decoding a symbol based on locating regions of interest in a plurality of images of the symbol that include unreadable regions, and combining the regions of interest to create a decodable image of the symbol. That is because the features and advantages of the technology are well suited for this purpose. Still, it should be appreciated that the various aspects of the technology can be applied in other forms of machine readable symbols, imaging systems, and imaging applications, including robotic controlled scanners, handheld imaging systems, and any other imaging system that may benefit from the ability to decode a symbol using image data combined from multiple captured images.

FIG. 1 shows an illustrative machine vision system 30 adapted to acquire one or more images 32 of an object 34 containing a machine readable symbol 36. Conveyor 38 transports the objects 34 and causes relative movement between the objects 34 and the field of view 40 of an imaging device 42. Exemplary machine vision systems may be used in a manufacturing assembly, test, measurement, automation, and/or control application, among others, as non-limiting examples. Machine vision system 30 may use image acquisition software 44 operable to perform any of various types of image acquisitions.

Imaging device 42 can include a processor 46 used for image processing and decoding, for example. The processor 46 can be coupled to a vision sensor 48, and can either be part of the vision sensor 48, or it can be locally linked to the vision sensor 48. The processor 46 can be encoded with the image acquisition software 44, or in some embodiments, the image acquisition software 44 can be run on a separate computing device 50 or processor. The image acquisition software 44 can be configured to, among other things, acquire multiple images within a single reading operation, control illumination, acquire image data, and process/decode the acquired image data into usable information.

Imaging device 42 can also include a memory medium 52 coupled to the vision sensor 48 and/or the processor 46. The memory medium 52 can be used for storing scanned or processed images 32 and buffering data and communications, and the like. A communication line 54 can also be coupled to the imaging device 42, and provide a connection point to an optional computer 50. The computer 50 can be used for uploading and downloading scanned or processed images 32, for example. It is to be appreciated that wireless communications are also contemplated. In this example, the imaging device 42 can be a conventional fixed mount scanner capable of providing high-angle and/or low-angle illumination, or a combination of high and low-angle illumination.

The various embodiments described herein allow combining image data from multiple images 32 of the object 34 to enable decoding symbols 36 that are otherwise not decodable from individual images. In particular, the various embodiments will be described in the context of imaging and decoding 2D matrix symbols. In this example, the symbol 36 is applied on a surface of the object 34 that is generally flat. Because the object 34 may be partially covered at times, not illuminated properly, or for any other reason, some portions of the symbol 36 can be rendered unreadable.

Figure 5:
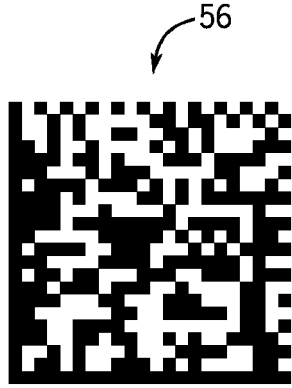
Figure 6:
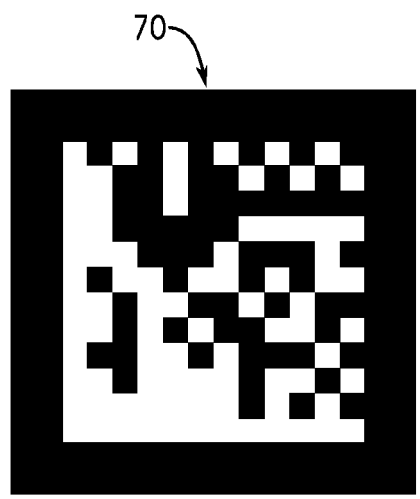
Figure 7:
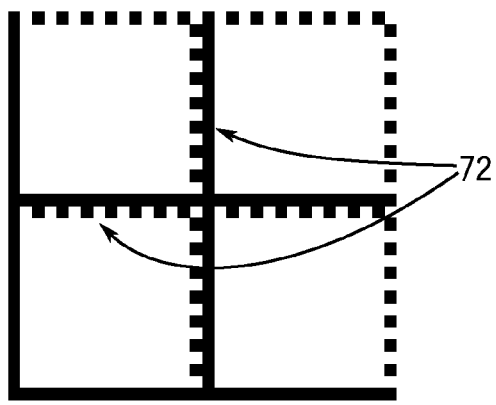

Referring to FIGS. 2-7, a 2D matrix symbol 56 can consists of one or more data regions 58 that contain nominally square symbol modules 60 set out in a regular array. The data region 58 is partially surrounded by a finder pattern 62 that is generally "L" shaped, and the data region 58 can be surrounded on all four sides by a quiet zone 64. A timing pattern 66 provides a count of the number of rows and columns in the symbol 36. FIG. 5 illustrates an example of a dark-on-light 2D matrix symbol 56, and FIG. 6 illustrates an example of a light-on-dark 2D matrix symbol 70. Alignment patterns 72 can also be included, and are typically used with larger grid size symbols (see FIG. 7.)

Machine vision system 30 may use symbol locating software 74 that locates 2D matrix symbols based on its rectangular or square shape or the unique finder pattern 62 and timing pattern 66 to locate promising candidates. In some embodiments, the image acquisition software 44 and the symbol locating software 74 can be combined into one software application, and in other embodiments, the image acquisition software 44 and the symbol locating software 74 can be separate software applications. Either or both the image acquisition software 44 and the symbol locating software 74 can reside and execute on the computer 50 or on the imaging device 42.

One embodiment of a symbol locating algorithm is described in U.S. Pat. No. 7,016,539, which is expressly incorporated herein. Other symbol locating algorithms are available and are contemplated for use. In use, the symbol locating software 74 can locate a symbol candidate by looking for the finder pattern 62 and/or the timing pattern 66 of the 2D matrix symbol. When the data region 58 of a symbol is so damaged that the symbol is not decodable, the symbol locating software 74 may locate multiple promising candidate regions that match the finder and timing patterns to a certain degree. A promising candidate region can be a region of a symbol that is located but is not decodable due to the insufficient amount of usable data in the image. A promising candidate region can be considered promising if more than 65 percent, for example, of the symbol modules 60 match expected finder pattern 62, timing pattern 66, and alignment pattern 72 if it is applicable.

Figure 8:
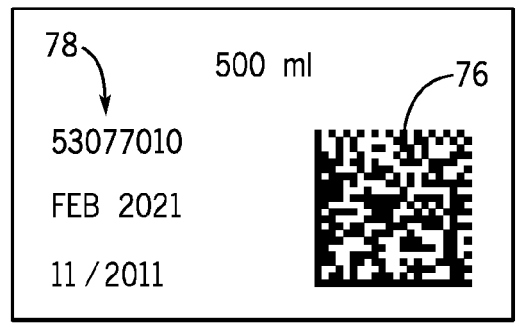
FIG. 8 is a view of a located promising candidate region and background clutter in an image.

Referring to FIG. 8, a promising candidate region 76 can be found using the symbol locating algorithm 74. The remaining symbols 78 in the image 80, e.g., text and numbers, can be considered as background clutter and ignored by the symbol locating software 74 if it does not contain any or enough of the features required to be a 2D matrix symbol, such as a finder pattern 62 and a timing pattern 66. As previously described, the image acquisition software 44 can acquire multiple images, so when a data region 58 of a symbol is so damaged that the symbol is not decodable, the symbol locating software 74 can match multiple promising candidate regions 76 from multiple images. In some embodiments, different image acquisition parameters can be used in the multiple images.

Figure 9:
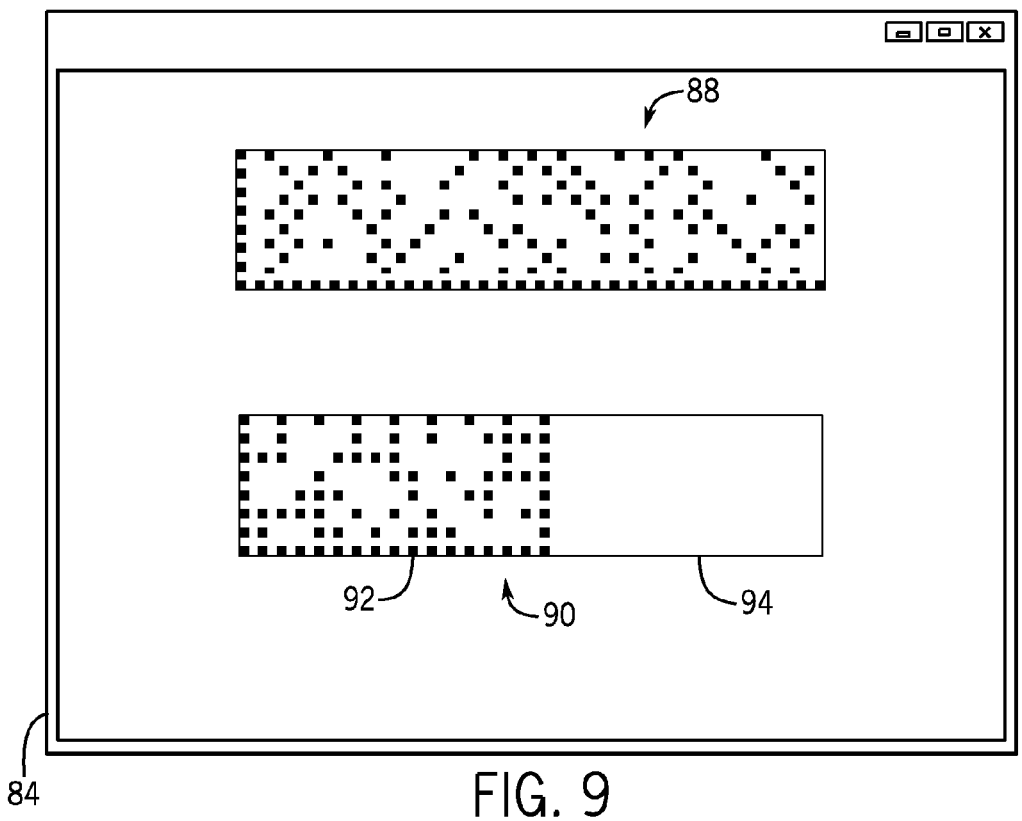
FIGS. 9 and 10 are a first and second image of an object and showing two promising candidate regions.
Figure 10:
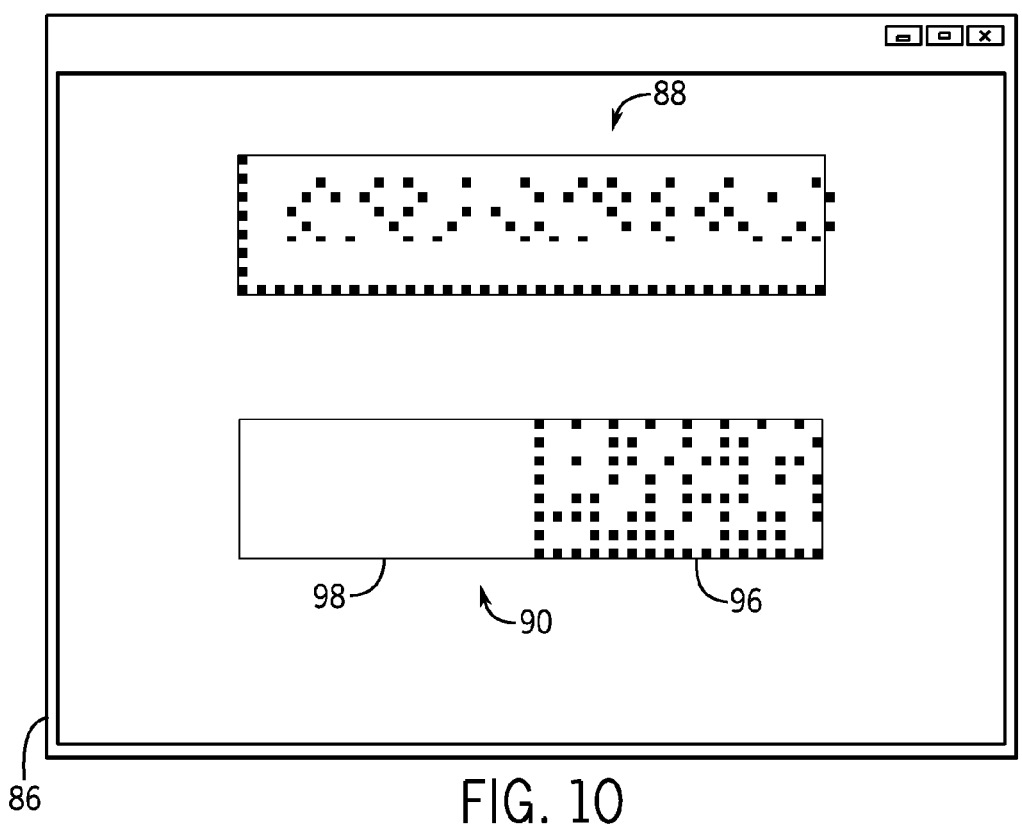

Referring to FIGS. 9 and 10, a first image 84 and a second image 86 are shown. The first image 84 taken of an object shows two promising candidate regions 88 and 90. The second image 86 is another image taken of the same object, and shows the same two promising candidate regions 88 and 90, except, due to some condition, the image data available in the second image 86 is different than the image data available in the first image 84. Image data from these two images 84 and 86, or a plurality of images, can be combined to create decodable data.

As seen in FIG. 9, the symbol locating software 74 can not determine that the promising candidate region 88 is a false promising region because it contains features the symbol locating algorithm is looking for, such as a finder pattern. This false candidate region can be an image of other symbologies or text or textures, for example. The symbol locating algorithm 74 can determine that the promising candidate region 90 is a 2D matrix symbol, which includes a promising data region 92 and a damaged region 94 on its right side (no symbol modules 60 appeared in the damaged region 94).

FIG. 10 shows the second image 86 of the two promising candidate regions 88 and 90. In this second image, the promising candidate region 88 is again a false promising region because it contains features the symbol locating software is looking for but the data modules are not decodable. The symbol locating software 74 can again determine that the promising candidate region 90 is a 2D matrix symbol, which, in the second image 86, includes a different promising data region 96 enclosing a damaged data region 98 on its left side.

In order to combine the promising candidate region 88 from the first image 84 with the promising candidate region 88 from the second image 86, and similarly, the promising candidate region 90 from the first image 84 with the promising candidate region 90 from the second image 86, in an attempt to create decodable data, binary matrices of the two promising candidate regions 88 and 90 are created and "stitched" together using a data stitching algorithm 100. FIGS. 11-16 show the progression of creating and stitching binary matrices of promising candidate regions 88 and 90.

Figure 11:
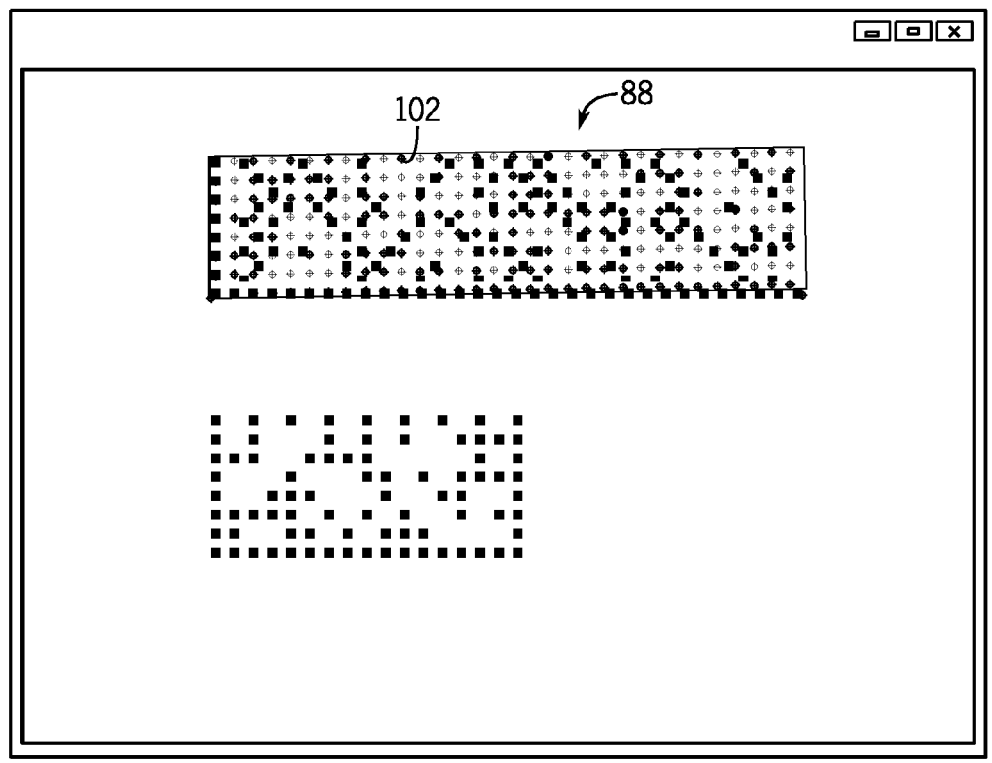
FIG. 11 is an image showing a binary matrix of the first promising candidate in the first image of FIG. 9.
Figure 12:
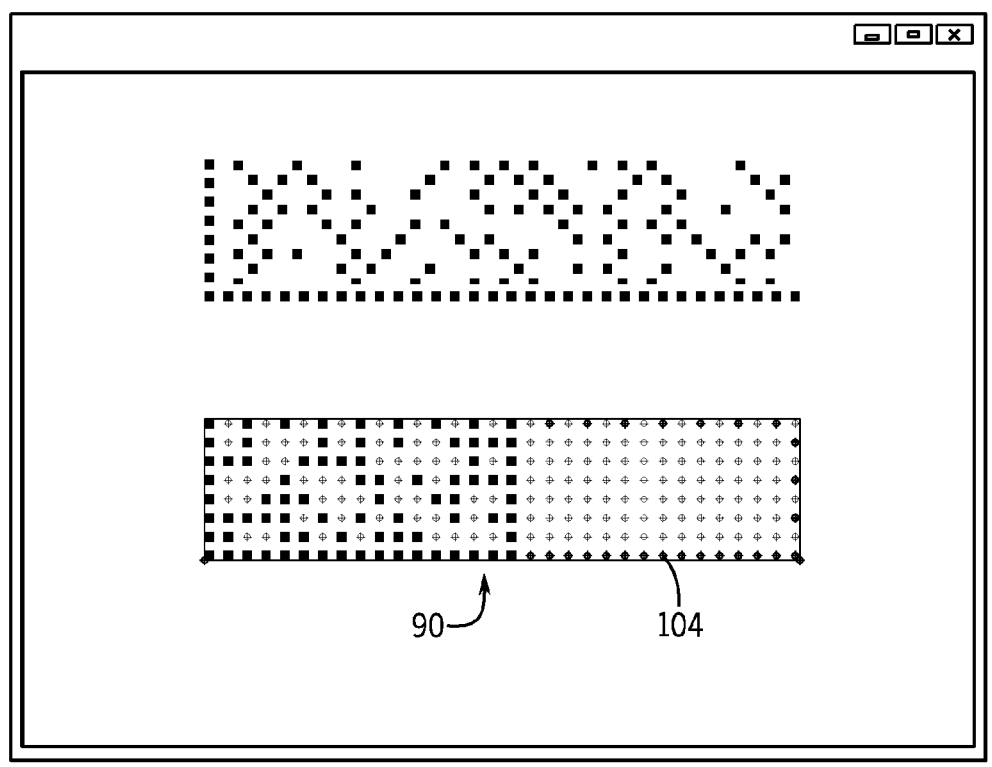
FIG. 12 is an image showing a binary matrix of the second promising candidate in the first image of FIG. 9.
Figure 13:
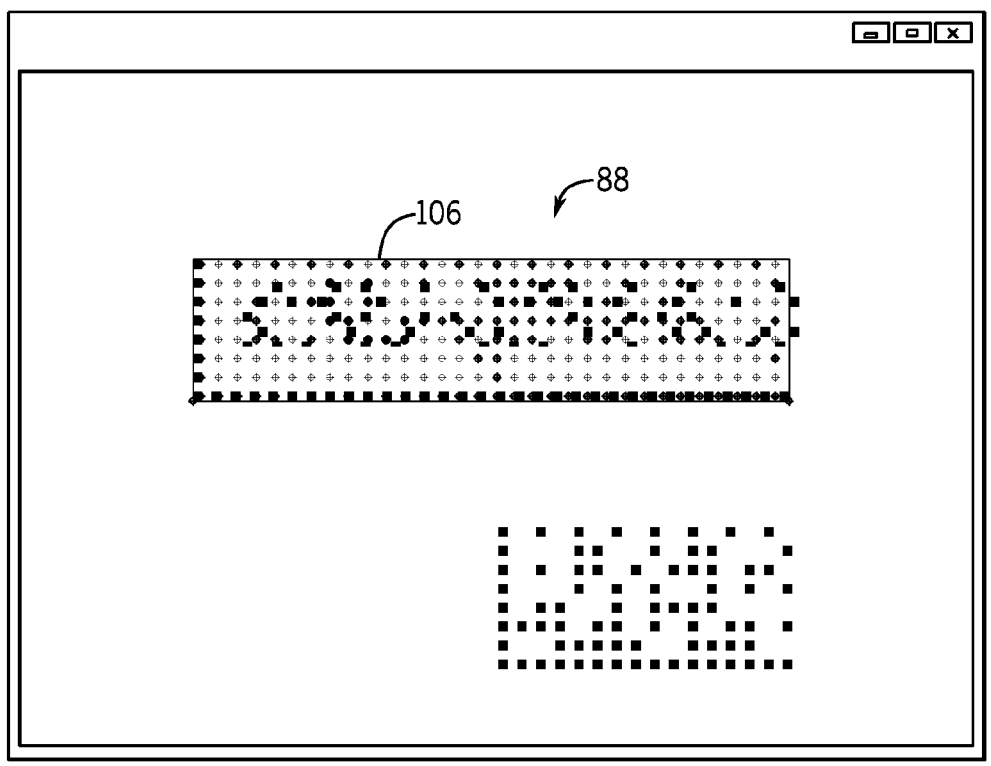
FIG. 13 is an image showing a binary matrix of the first promising candidate in the second image of FIG. 10.
Figure 14:
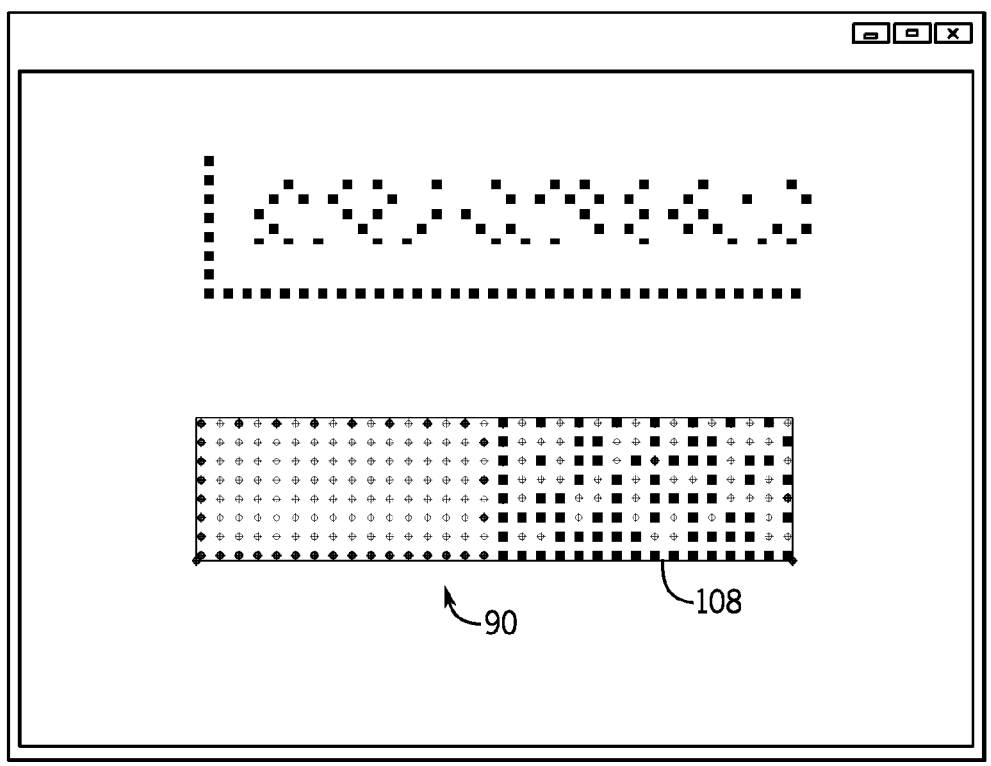
FIG. 14 is an image showing a binary matrix of the second promising candidate in the second image of FIG. 10.

FIG. 11 shows a binary matrix 102 of promising candidate region 88 created from the first image 84. FIG. 12 shows a binary matrix 104 of promising candidate region 90 also created from the first image. Similarly, FIG. 13 shows a binary matrix 106 of promising candidate region 88 created from the second image 86, and FIG. 14 shows a binary matrix 108 of promising candidate region 90 also created from the second image.

Figure 15:
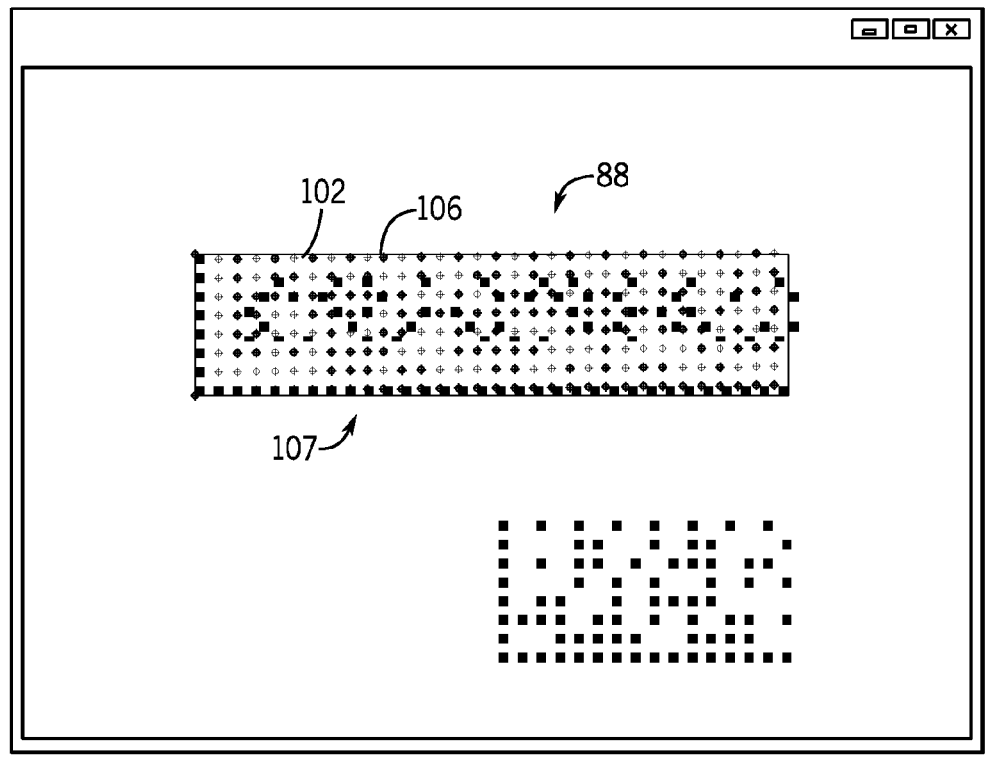
FIG. 15 is an image showing an accumulated binary matrix that stitched the binary matrix of the first promising candidate in the first image of FIG. 9 and the binary matrix of the first promising candidate in the second image of FIG. 10.
Figure 16:
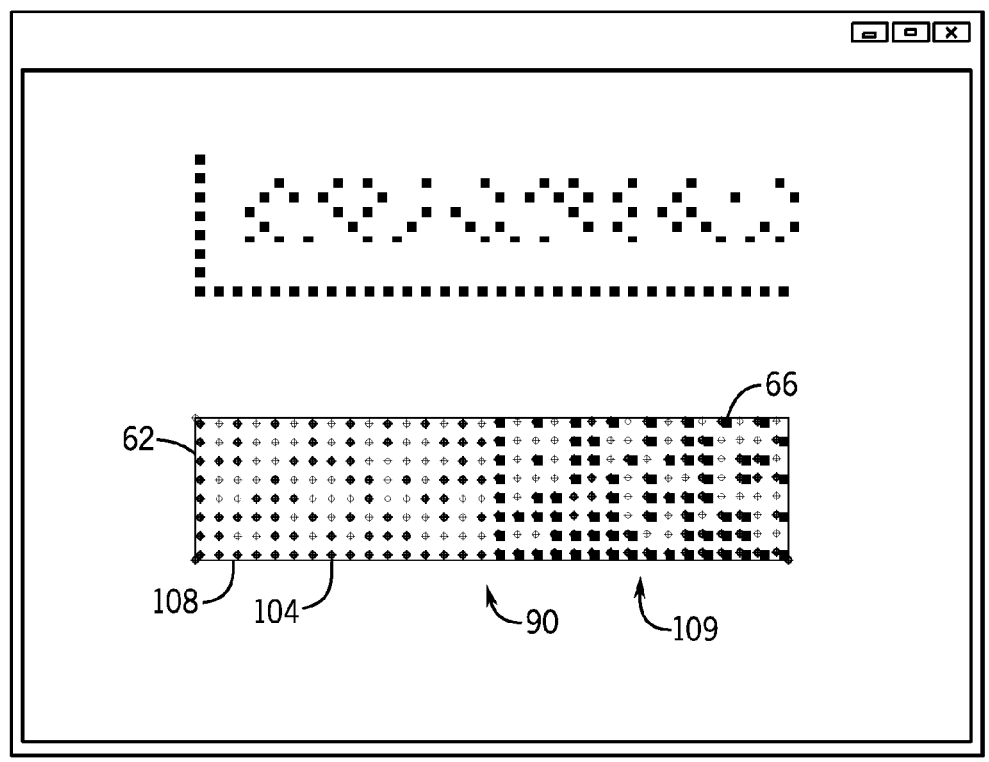
FIG. 16 is an image showing an accumulated binary matrix that stitched the binary matrix of the second promising candidate in the first image of FIG. 9 and the binary matrix of the second promising candidate in the second image of FIG. 10.

FIGS. 15 and 16 show stitched binary matrices developed from both the first image 84 and the second image 86 for both promising candidate region 88 and promising candidate region 90. In FIG. 15, the stitched binary matrices 102 and 106 of promising candidate region 88 from the first image 84 and the second image 88 remain not decodable from the accumulative binary matrix 107. Features such as a finder pattern and/or a timing pattern are not detectable by the symbol locating software 74. Conversely, in FIG. 16, the stitched binary matrices 104 and 108 of promising candidate region 90 from the first image 84 and the second image 86 is decodable from the accumulative binary matrix 109. As can be seen, both a finder pattern 62 and a timing pattern 66 are detectable by the symbol locating software 74.

In some instances, when a plurality of images are acquired of the same symbol, the position of the symbol and/or promising candidate regions of the symbol, may be changed between images. This can be due to changes in illumination, or just as likely, object motion. Embodiments of the technology address changing positions of a symbol in a plurality of images by using a correlation between a synthetic model of the symbol and available symbol data 110 in a current image of the symbol to find the position association, referred to herein as correspondence. The data stitching algorithm 100 can assume that the change in position can be modeled by using known affine transformation techniques. When the symbol locating software 74 operates on subsequent images (not necessarily the next image or images) acquired on the same object 24, the symbol locating software 74 or the data stitching algorithm 100 can establish the correspondence, e.g., association, between a previously obtained promising candidate region(s) and symbol data 110 in the current image.

Figure 17:
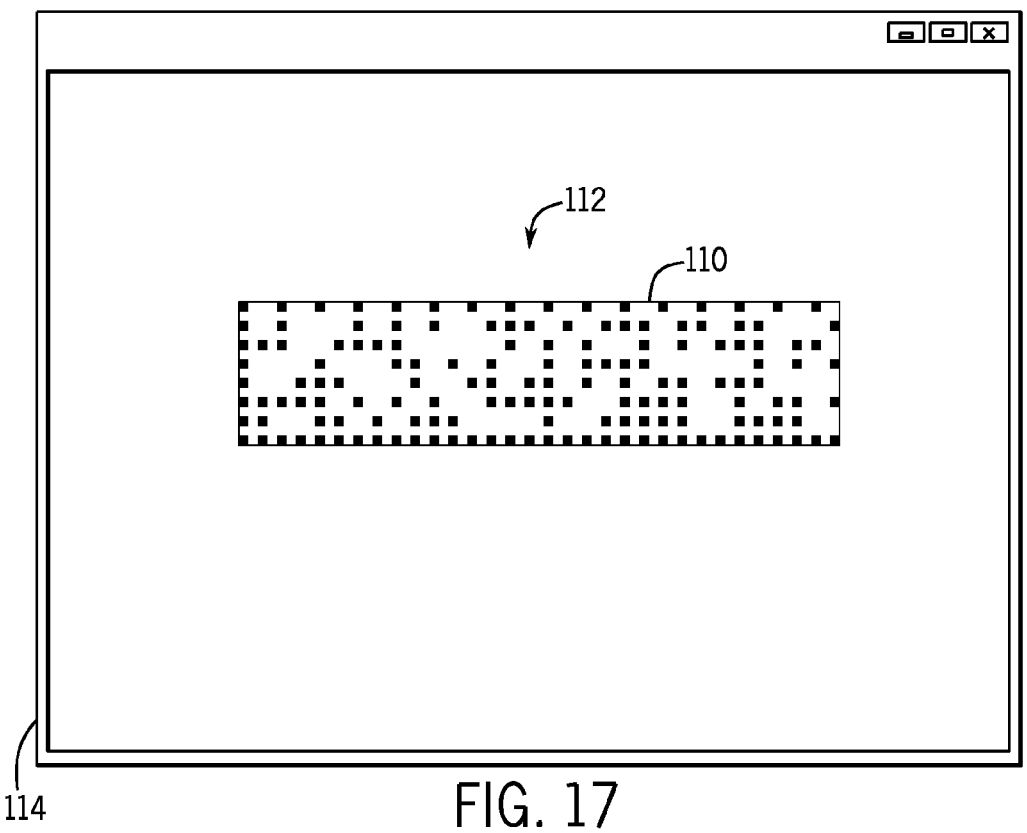
FIG. 17 shows a first image of a symbol.
Figure 18:
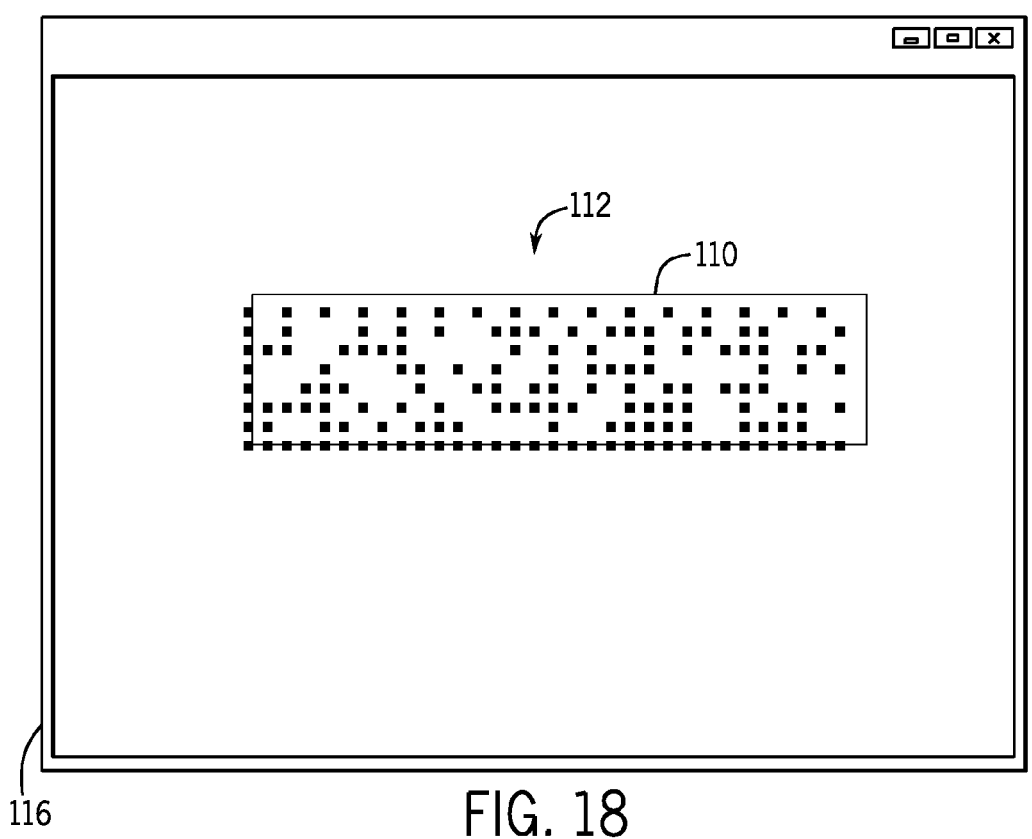
FIG. 18 shows a subsequent, or second image of the same symbol in FIG. 17, and showing the symbol slightly moved.

FIG. 17 shows a first image 114 and FIG. 18 shows a subsequent, or second image 116 of the same symbol 112, where in the second image 116, the symbol 112 has moved (slightly down and to the left) in relation to where the symbol 112 was located in the first image 114. Because of this movement between first and second images 114 and 116, a correlation between the images is developed.

Figure 19:
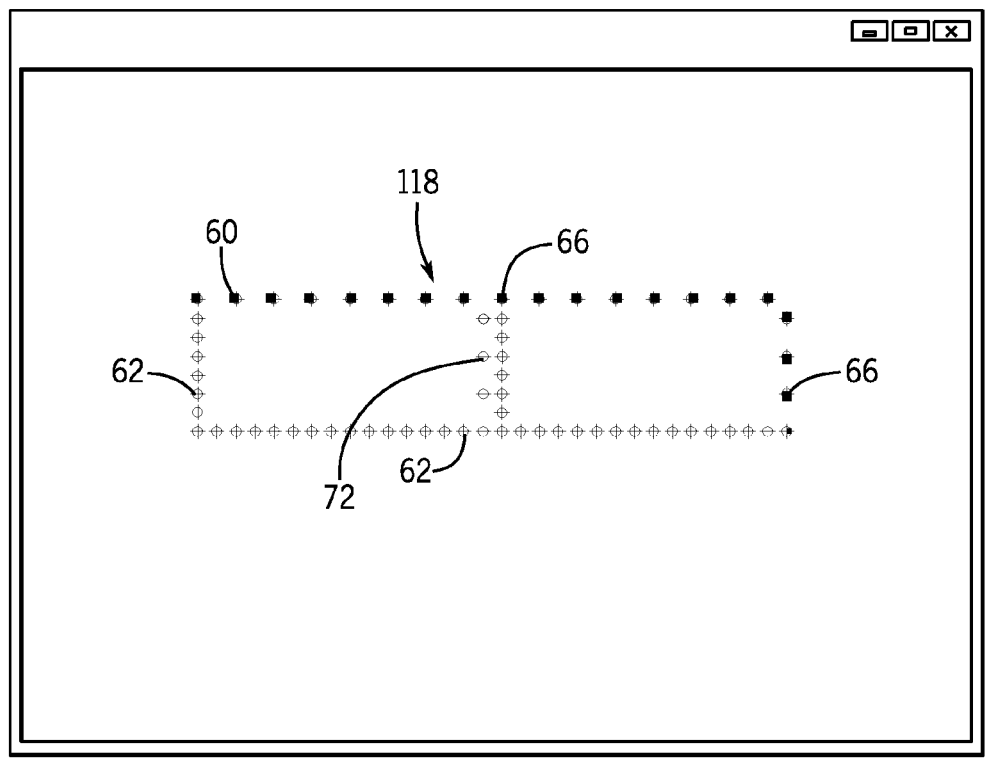
FIG. 19 shows a synthetic model usable with a correlation technique.

Referring to FIG. 19, according to a correlation technique, a synthetic model 118 can be created using the data stitching algorithm 100. The synthetic model 118 is a model of known features of a particular symbol, in this example a 2D 8x32 matrix symbol. The synthetic model 118 can be generated by using at least one of the known finder pattern 62, timing pattern 66, and possibly alignment pattern 72. The correlation can be done using known image analysis methods, including a gray level image analysis or a known filtered image analysis, for example. In this example, the dot filter analysis Determinant of Hessian (DOH) was used to produce a set of features, the set of features being enhanced dots 120. DOH is a popular known technology used to enhance dots. Methods to find the correspondence can be expanded to more complicated models, such as perspective models, and polynomial models depending on the application and speed requirements. By using the DOH technology, the known symbol modules 60 should produce a higher DOH response. The set of features can vary for different applications.

Figure 20:
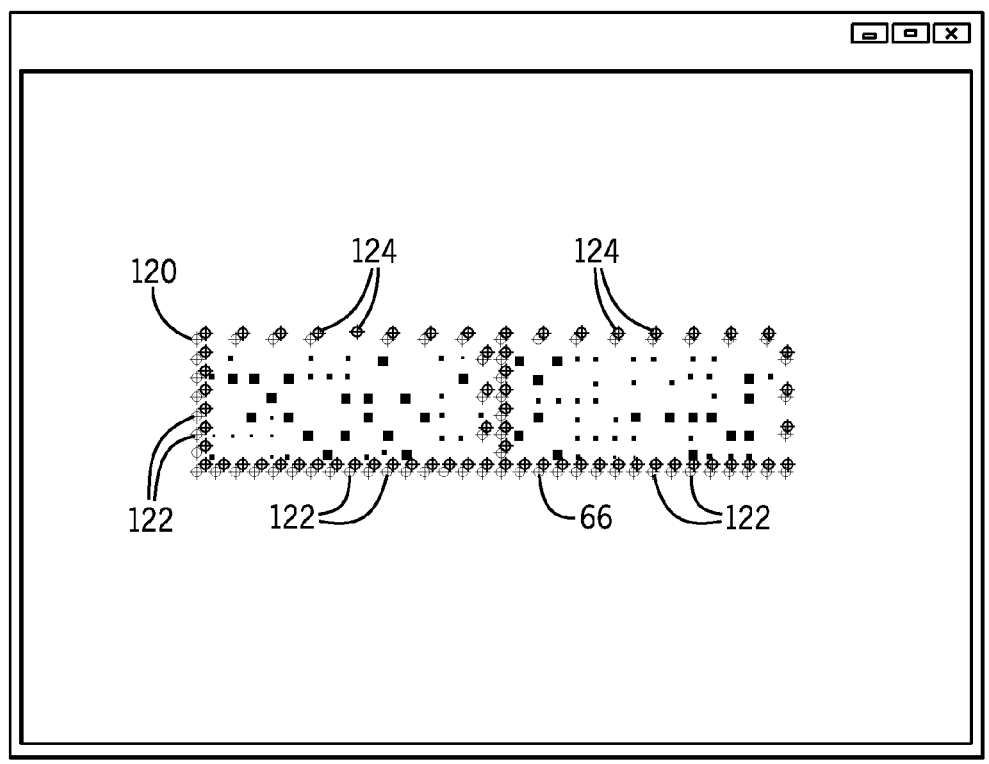
FIG. 20 shows the symbol position for which the correlation between the synthetic symbol model and the second image is the highest within a parameter space of scale and position.
Figure 21:
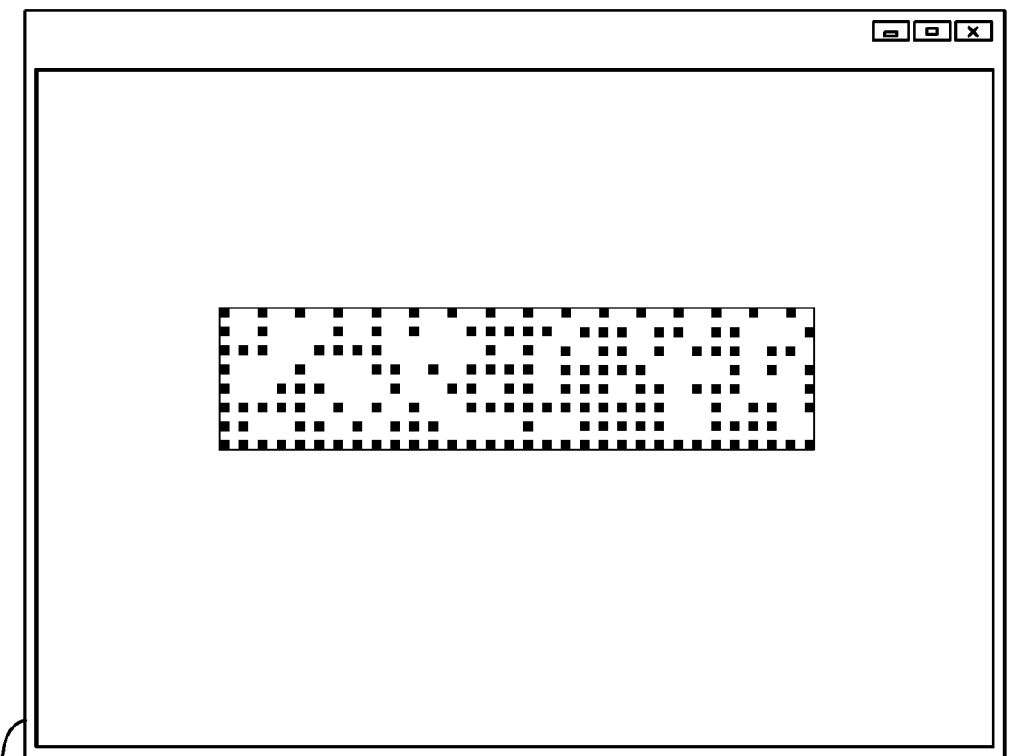
FIG. 21 shows a refined promising region in the second image.

Referring to FIG. 20, by using the correlation technique, the correspondence between the synthetic model 118 and the moved second image 116 can be found. The correspondence can be established by maximizing a correlation score in a parameter space including scale, angle and translation. The shifted set 122 of symbol modules 66 show a higher DOH response than the modules positions 124 estimated from the first symbol region in the first image 114, indicated the correlation to the synthetic model 118 is higher. The shifted set 122 are the new module positions estimated from correlating the synthetic model 118 with the DOH response. Finally, with the correlation to the synthetic model 118 established, the second image 116 can be refined according to the correlation to produce a refined promising region 126, as seen in FIG. 21. With the new refined second image 126, the data stitching algorithm 100 can be used to stitch together the data matrix from the first image 114 and the data matrix from refined promising region 126, as previously described above. The confidence of each sampling point, a sampling point being a symbol module 66, can be obtained and a corresponding accumulative binary matrix 109 (such as shown in FIG. 16) can be updated until the accumulative binary matrix 109 result is able to be decoded.

Figure 22:
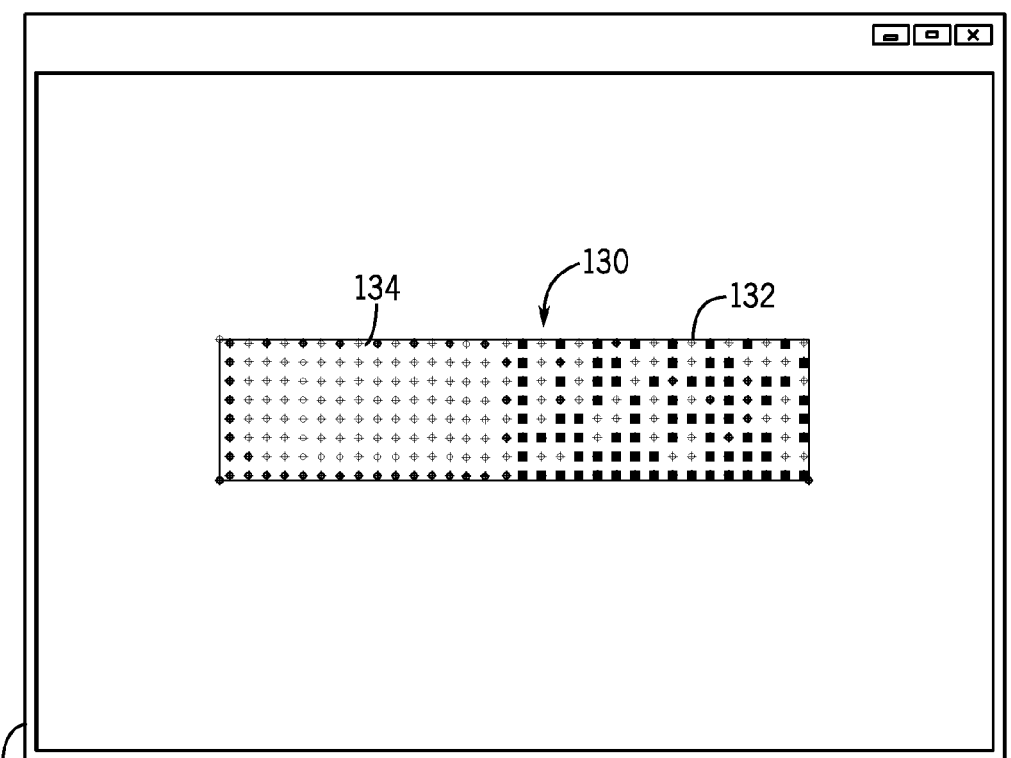
FIG. 22 shows a first image of a symbol using a bright field illumination with a promising candidate region enclosing a damaged data region.
Figure 23:
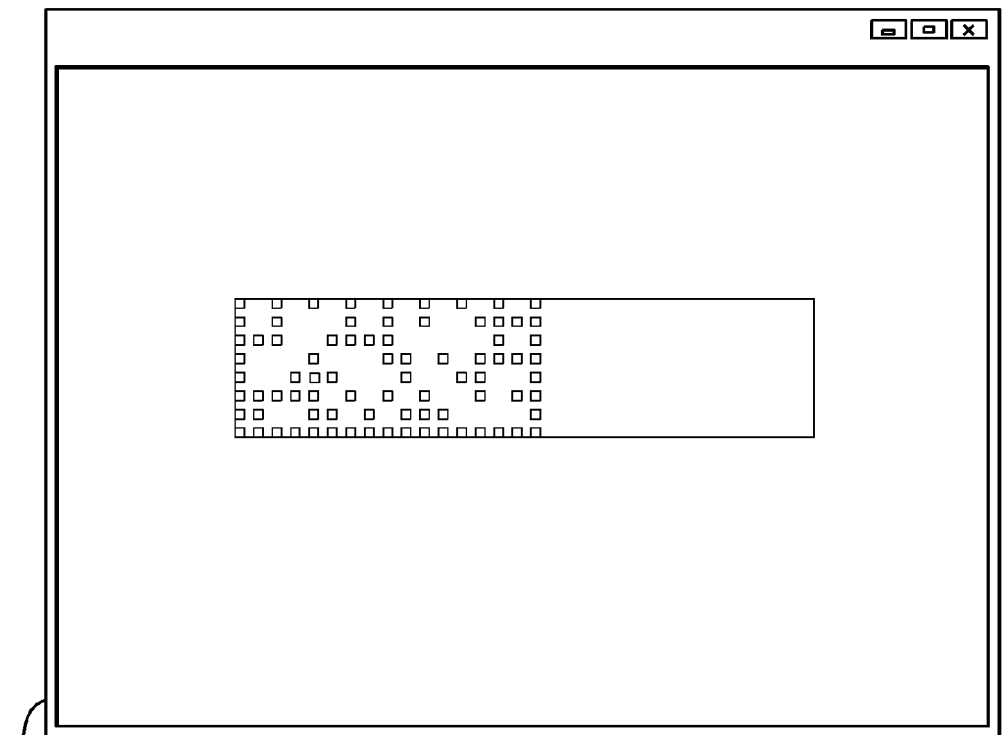
FIG. 23 shows a second image of the symbol of FIG. 22 with an unknown polarity.

In some embodiments, the data stitching algorithm 100 can analyze images with the same or opposite polarities. FIG. 22 shows a first image 128 of a symbol 130 using a bright field illumination with a promising candidate region 132 and a damaged region 134 on the left side. When a second image 140 (see FIG. 23) is acquired and the polarity of the second image is unknown, the data stitching algorithm 100 can be used to determine the polarity of the second image 140 by analyzing a promising candidate region in the second image.

Figure 24:
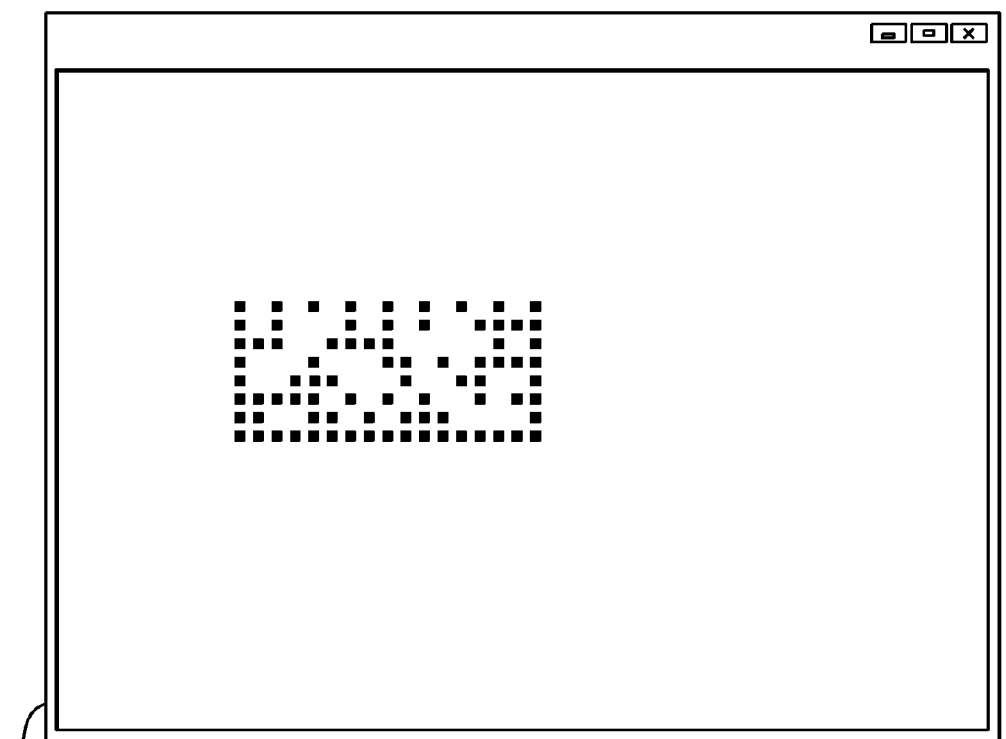
FIG. 24 shows a first DOH image using a light-on-dark filter.
Figure 25:
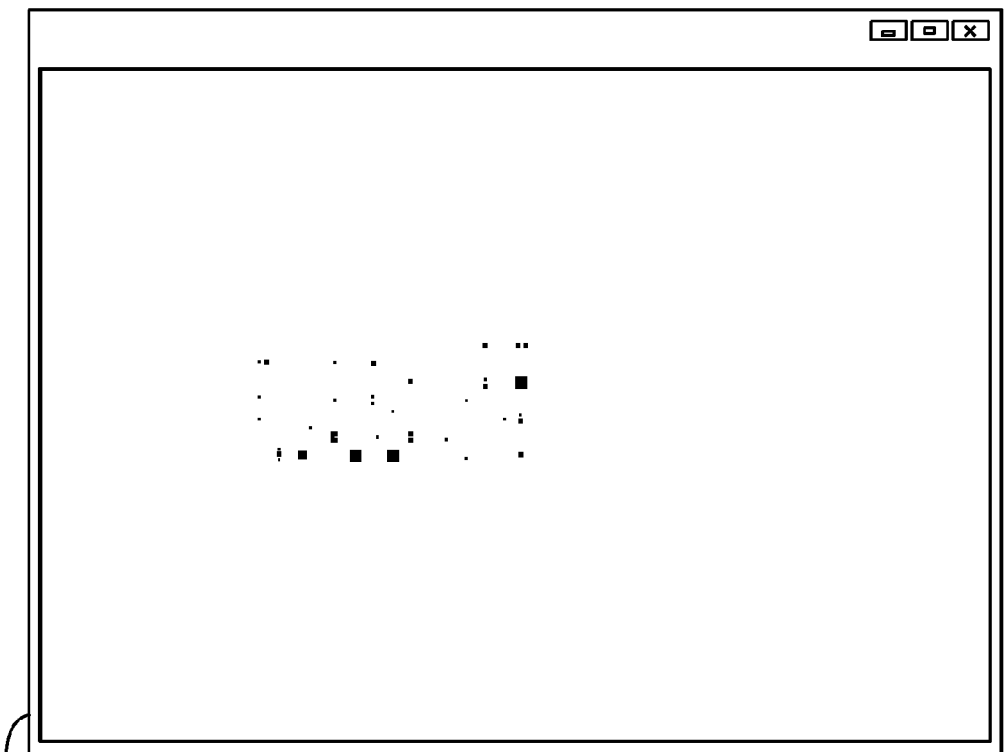
FIG. 25 shows a second DOH image using a dark-on-light filter.

Referring to FIGS. 24 and 25, two DOH images are generated using the second image 140, a first DOH image 136 using a light-on-dark filter (FIG. 24) and a second DOH image 138 using a dark-on-light filter (FIG. 25). Then, as previously described above, a correlation based method can be applied to both the first DOH image 136 and the second DOH image 138 to find the correspondence in both DOH images 136 and 138. In this example, the correlation score from the first DOH image 136 using the light-on-dark filter is higher than the correlation score from second DOH image 138 using the dark-on-light filter. Based on the higher correlation score for the first DOH image 136 using the light-on-dark filter, the data stitching algorithm 100 determines the polarity of the analyzed second image 140 to be light-on-dark.

Figure 26:
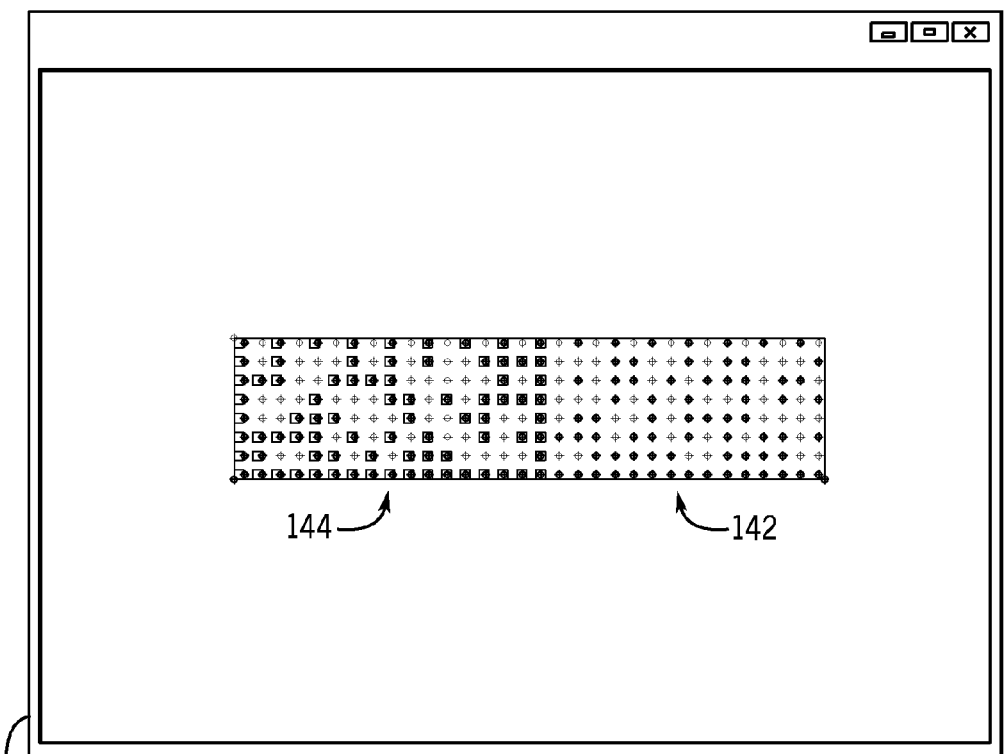
FIG. 26 shows the decodable stitched and accumulated binary matrices from the first image of FIG. 22 and the second image of FIG. 23.

With the polarity determined, the data stitching algorithm 100 can proceed to stitch together the data matrix from the first image 128 and the data matrix from the analyzed second image 140, as previously described above. FIG. 26 shows an image 146 of the decodable stitched and accumulated binary matrices 142 and 144 from the first image 128 and the second image 140, respectively.

Although the present technology has been described with reference to preferred embodiments, workers skilled in the art will recognize that changes may be made in form and detail without departing from the spirit and scope of the technology. For example, the present technology is not limited to the embodiments of 2D data matrix symbols, and may be practiced with other machine readable symbol technology.

The specific methods described herein can be generalized to handheld applications, and the correspondence methods described herein can be generalized to pattern alignment applications.

The technology disclosed here can be applied to stitching data for other ID application such as OCR reading from multiple images. A known method of OCR reading from multiple images is to select read characters with the highest score from individual images. The known method requires individual characters to be readable from at least one image. With this technology, the character reading can occur after the individual strokes of a character are combined from multiple images.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A system for decoding a symbol using images of the symbol, the system comprising:
    an imaging device, the imaging device to acquire a first image and a second image, the first image including a first symbol data region, and the second image including a second symbol data region; and
    a processor, the processor operatively coupled to the imaging device, the processor to execute a data stitching algorithm, wherein the data stitching algorithm generates a synthetic model of the symbol, the synthetic model being a model of a plurality of known features of a particular symbol, the data stitching algorithm correlates the synthetic model of the symbol with at least one of the first image and the second image, the data stitching algorithm further converts the first symbol data region into a first binary matrix and the second symbol data region into a second binary matrix, the data stitching algorithm accumulating the first binary matrix with the second binary matrix to generate an accumulative binary matrix, the accumulative binary matrix being a decodable representation of the symbol.

2. The system according to claim 1,
    wherein the first image is acquired using a first set of acquisition parameters, and the second image is acquired using a second set of acquisition parameters, the second set of acquisition parameters being different than the first set of acquisition parameters.

3. The system according to claim 1,
    wherein the first symbol data region and the second symbol data region overlap.

4. The system according to claim 1,
    wherein a portion of at least one of the first symbol data region and the second symbol data region is corrupt and not decodable.

5. The system according to claim 1,
    wherein the accumulated binary matrix includes at least one pattern recognition feature.

6. The system according to claim 1,
    wherein the first symbol data region has a first position and a first scale, and the second symbol data region has a second position and a second scale, the second position and the second scale being different than the first position and the second scale; and
    the data stitching algorithm further generating a correspondence, the correspondence to associate the first position and the first scale and the second position and the second scale.

7. The system according to claim 1,
    wherein the first image includes a first polarity and the second image includes a second polarity different from the first polarity.

8. A system for establishing a correspondence between a first image and a subsequent image of a machine readable symbol, the system comprising:
    an imaging device, the imaging device to acquire the first image and the subsequent image, the first image including a first symbol data region, and the subsequent image including a subsequent symbol data region, the first symbol data region having a first position and a first scale, and the subsequent symbol data region having a second position and a second scale, the second position and the second scale being different than the first position and the first scale;
    a processor, the processor operatively coupled to the imaging device, the processor to execute a data stitching algorithm, wherein the data stitching algorithm generates a synthetic model of the machine readable symbol, the synthetic model being a model of a plurality of known features of a particular symbol, and performs a correlation on a synthetic model position to the second position and the second scale of the subsequent symbol data region; and
    based on the correlation, the second position and the second scale of the subsequent symbol data region is adjusted to produce a refined subsequent image, such that the first image and the subsequent image can be stitched together for decoding.

9. The system according to claim 8,
    wherein the data stitching algorithm converts the first symbol data region from the first image into a first binary matrix and the subsequent symbol data region from the refined subsequent image into a second binary matrix, the data stitching algorithm accumulating the first binary matrix with the second binary matrix to generate an accumulative binary matrix, the accumulative binary matrix being a decodable representation of the symbol.

10. The system according to claim 8,
    wherein establishing the correspondence further includes maximizing a correlation score in a parameter space.

11. The system according to claim 10,
    wherein the correlation uses an image analysis method, the correlation to produce a set of features to establish the correlation score.

12. The system according to claim 8,
    wherein the imaging device is a handheld imaging device.

13. The system according to claim 8,
    wherein the machine readable symbol is an alphanumeric symbol.

14. The system according to claim 8,
    wherein the machine readable symbol is a 2D matrix symbol.

15. A method for decoding a symbol using images of the symbol, the method comprising:
    generating a synthetic model of the symbol, the synthetic model being a model of a plurality of known features of a particular symbol;

acquiring a first image and a second image using an imaging device, the first image including a first symbol data region, and the second image including a second symbol data region;

correlating the synthetic model of the symbol with the first image and extracting a first binary matrix correlating the synthetic model of the symbol with the second image and extracting a second binary matrix;

accumulating the first binary matrix with the second binary matrix; and generating an accumulative binary matrix, the accumulative binary matrix being a decodable representation of the symbol.

16. The method according to claim 15, further including executing a data stitching algorithm using a processor operatively coupled to the imaging device, the data stitching algorithm performing the accumulating and the generating steps.

17. The method according to claim 15, further including decoding the accumulative binary matrix using symbol decoding software.

\* \* \* \* \*